July 18, 1944.  H. W. SWIFT  2,353,948
MOVING FLOOR VEHICLE
Filed July 22, 1943  2 Sheets-Sheet 2
FIG.2.
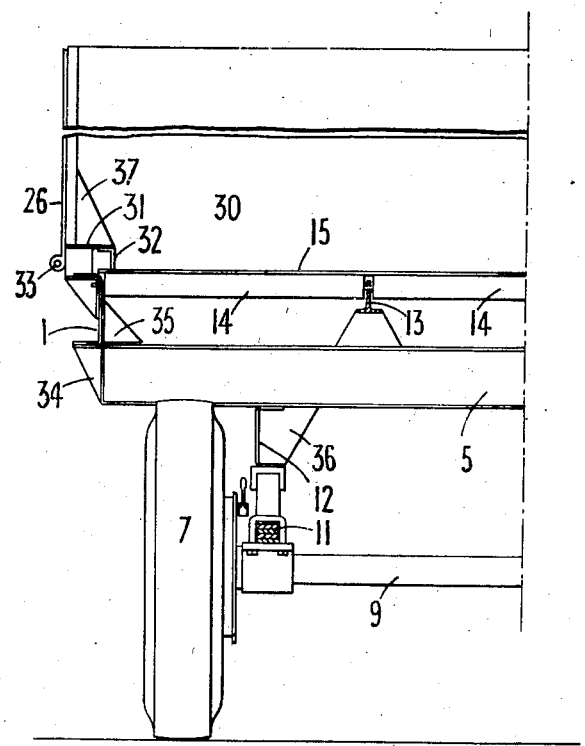
INVENTOR
HERBERT WILSON SWIFT
BY
HIS ATTORNEY Patented July 18, 1944

2,353,948

UNITED STATES PATENT OFFICE 2,353,948

MOVING FLOOR VEHICLE

Herbert Wilson Swift, Bolton, England, assignor to Bromilow and Edwards Limited, Bolton, England Application July 22, 1943, Serial No. 495,743
In Great Britain October 31, 1940

2 Claims. (Cl. 214—83)

This invention relates to moving floor vehicles with more especial reference to trailers or semi-trailers, and has for its object to provide an improved construction of light-weight moving floor vehicle capable of being cheaply manufactured and assembled and which is convenient and durable in use.

Customarily, moving floors of the kind comprising a subframe having supporting rollers on which rides a flexible band constituting the floor proper, have been mounted on the main frames of more or less orthodox multi-wheeled trailers or the two wheeled semi-trailers of articulated vehicles, and this arrangement as will be understood—owing to the duplication of the frames—entails undesirable increase in weight and cost of manufacture and unavoidably raises the centre of gravity of the assembly.

In accordance with the present invention a lightweight moving floor vehicle, more especially a trailer or semi-trailer, has a unitary all-metal frame comprising longitudinally extending side frames and a pair of intermediate longitudinals, and three rows of rollers supporting the band or floor carried by said frames and longitudinals, the rollers of the intermediate row being staggered in relation to those of adjacent rows, and cross members bridging the side frames to form a chassis or frame for the vehicle resting on its wheeled undercarriage. A subframe for carrying the rollers, additional to the main frame, is thus avoided.

The staggered roller arrangement forms the subject of Patent No. 1,970,899 and preferably the side frames and intermediate longitudinals carrying the rollers are of rolled or pressed channel or T-section steel or light alloy, the end drums on which the flexible band is mounted being borne in gearboxes on the side frames which also constitute the main longitudinal frame or chassis of the trailer.

Where the trailer is equipped with a steerable forecarriage, the front gearbox or gearboxes may be inverted or otherwise positioned so as not to depend below the main longitudinals thereby to leave adequate clearance for the steering movements of the turntable or forecarriage, and, particularly where heavy or sticky loads are to be dealt with, the rear end gearbox may be duplicated or a cross-shaft furnished so that two operators may work, one at each side in moving the floor rearwardly during unloading. Alternatively, by resort to mechanism, such as that described in patent specification No. 2,129,796, the floor may be power operated from the engine of the vehicle towing the trailer in which event the vehicle power take-off will conveniently be connected to the trailer through flexible shafting or in other appropriate manner.

A specific embodiment of rear loading and discharging moving floor trailer has a pair of main longitudinals or side frames of channel section bridged by cross-members which at the front are carried by the steering turntable and front wheels and at the rear by the rear wheels, through the medium of conventional spring suspensions. On the cross members rest two intermediate longitudinals of inverted T-section forming with the outer frames bearings for three rows of freely rotating rollers, the rollers of each row being staggered in relation to those of adjacent rows as in specification No. 1,970,899, and the flexible band riding on the rollers between end drums on one or other of which it is wound during loading or discharging as the case may be. The main longitudinals which carry the rollers on the one hand, thus constitute the main frame of the trailer on the other.

The end drums are borne by gearboxes mounted at the ends of the main frame members, the rear gearbox being duplicated and the front gearbox inverted as aforementioned.

This embodiment will be further described with reference to the accompanying explanatory and to some extent diagrammatic drawings wherein:

Fig. 2 is a detail sectional view of the moving floor trailer looking from the rear.

Figure 1:
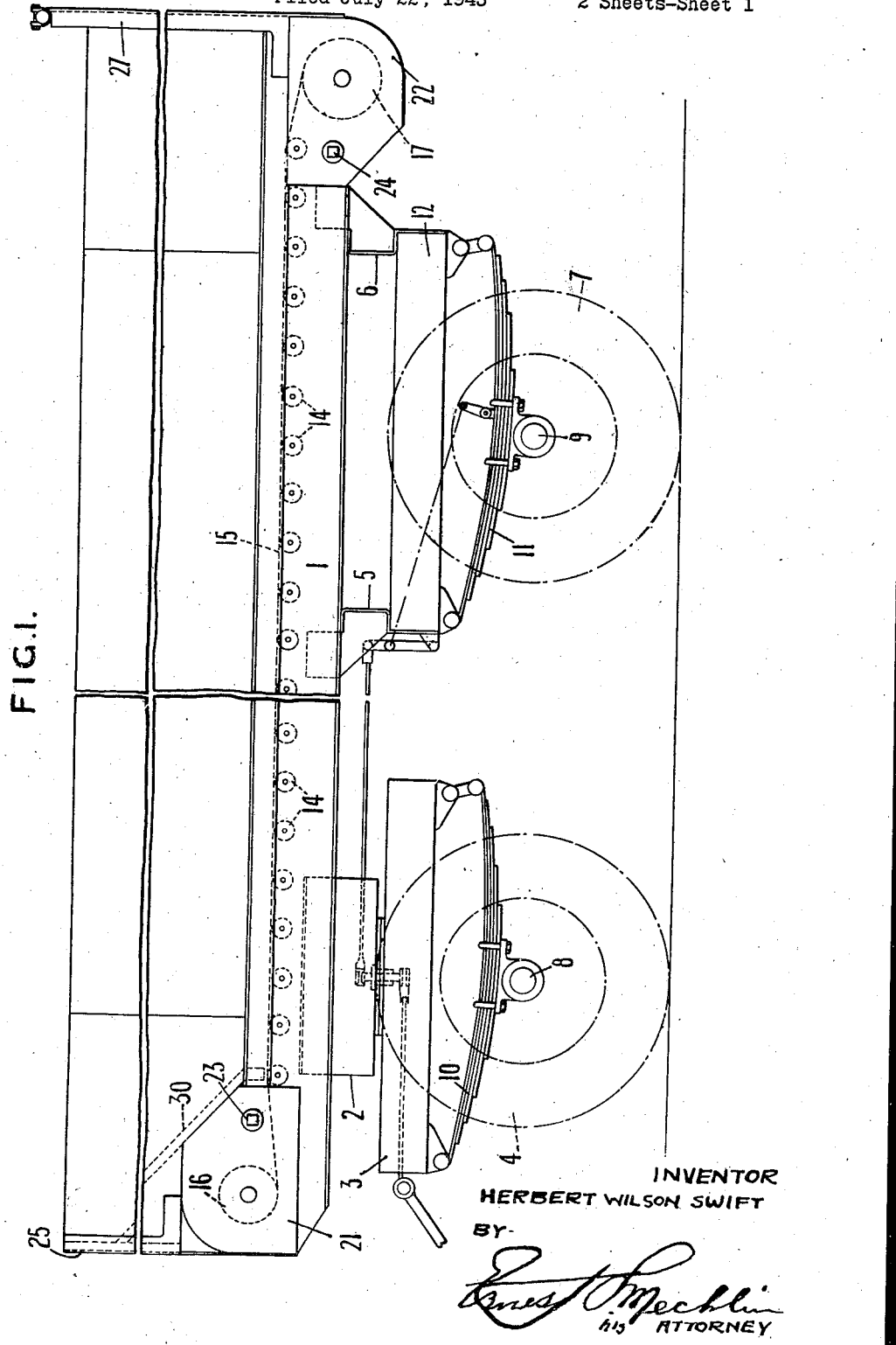
Fig. 1 is a side elevation.

In this embodiment of rear loading and discharging moving floor trailer the pair of main longitudinal or side frames 1 of channel section are bridged at the front by a cross-member 2 carried by the steering turntable 3 and front wheels 4 and at the rear by cross-members 5 and 6 carried by the rear wheels 7. Both sets of wheels are shown furnished with pneumatic tires and their axles 8 and 9 respectively support the vehicle through conventional semi-elliptic leaf springs 10 and 11, the front springs 10 being shackled to the turntable 3 and the rear springs 11 being shackled to the ends of secondary longitudinal channel members 12 as clearly shown in both figures.

On the cross-members 2, 5 and 6 rest the two intermediate longitudinals of inverted T-section, one of which is shown at 13 in Fig. 2 and which intermediate longitudinals provide with the main side frames 1 bearings for three rows of freely rotating rollers 14, the rollers of each row being staggered in relation to those of adjacent rows as and for the purpose described in the aforementioned Specification 1,970,899, and the flexible band 15 which constitutes the floor riding on the rollers 14 between the end drums 16 at the front and 17 at the rear, on the one or other of which it is wound during loading or discharging as the case may be.

The front end drum 16 is borne in a gearbox 21 carried at the front end of the nearside main longitudinal or side frame 1 and as shown this gearbox is inverted so as not to depend below such main longitudinal thereby to leave adequate clearance for the steering movements of the turntable or forecarriage 3.

The rear-end drum 17 is borne by gearboxes 22 positioned at the rear of the main longitudinals or side frames 1 and for operating the gearboxes 21 and 22, squared sockets are shown at 23 and 24 respectively for the receipt of a handle or handles. Similar sockets may be furnished in the gearboxes at the opposite side of the vehicle so that two operators may work, one at each side, in moving the floor and the reduction gearing may be duplicated in the gearboxes at each side to this end or the handle-engaging socket 22 may be formed at the opposite ends of a through shaft.

The main frame members also carry a front wall 25, side walls 26 and a rear wall or door 27, which latter is shown as a top-hinged tail door adapted to facilitate the discharge of material during the rearward movement of the flexible band 15 constituting the floor.

30 is a sloping partition or baffle inclined rearwardly from the front wall 25 and serving to cover the front end drum 16 thus to prevent fouling when the trailer is employed for the transport of sticky, granular or other small, loose material having a tendency to adhere to the moving band 15.

Also, as more clearly shown in Fig. 2 the side walls 26 are internally lipped at 31 and furnished with longitudinally running angle members 32 for the length of the flexible band 15 which angles closely overlie the edges of the latter and prevent any small, loose material which is being transported from falling between the band and the side wall 26.

Such side walls may be bottom-hinged at 33 as shown to facilitate manual loading or unloading at the side when necessary.

The frame members may be securely interconnected by rivets and/or by welding and the structure may be reinforced by webs or fillets such as those shown at 34 and 35 for the connection between the side-members 1 and the cross-member 5, 36 for the secondary longitudinal 12, and 37 between the frame of the side wall 26 and the internal lip 31 thereon, thus permitting of the employment of light gauge structural members.

In the case of semi-trailers, the front cross-member 2 would be carried by the turntable of the traction unit.

By the present invention improved construction of light-weight moving floor vehicles and especially trailers are obtained.

What I claim is:

1. A lightweight moving floor vehicle, more especially a trailer or semi-trailer, having a unitary all-metal frame comprising a pair of longitudinally extending side frames and a pair of intermediate longitudinals, three rows of rollers for supporting the band or floor carried by said side frames and intermediate longitudinals, the rollers of the intermediate row being staggered in relation to those of adjacent rows, and cross members bridging the side frames and positioning the intermediate longitudinals to form a chassis or frame for the vehicle, a steerable wheeled carriage on which the front of said chassis pivotally rests, and a separate wheeled carriage on which the rear of said chassis is rigidly mounted.

2. A lightweight moving floor vehicle according to the preceding claim including a top-hinged tail door to facilitate discharge of the contents of the floor and bottom-hinged side-walls, which facilitate manual unloading to the side when necessary.

HERBERT WILSON SWIFT.